United States Patent
Yeh

(10) Patent No.: US 6,675,010 B1
(45) Date of Patent: Jan. 6, 2004

(54) MOBILE COMMUNICATION SYSTEM FOR LEARNING FOREIGN VOCABULARY

(76) Inventor: Hao Ming Yeh, 7F, No. 235, Section 4, Hsin-Yi Road, Taipei (TW)

( * ) Notice: Subject to any disclaimer, the term of this patent is extended or adjusted under 35 U.S.C. 154(b) by 617 days.

(21) Appl. No.: 09/598,901

(22) Filed: Jun. 22, 2000

(51) Int. Cl.[7] .................................................. H04Q 7/20
(52) U.S. Cl. ........................................ 455/422.1; 704/7
(58) Field of Search ............................. 455/411, 414.1, 455/422.1, 414.4, 466, 413, 415; 707/100, 101, 102, 103 R, 103 Y, 103, 103 Z, 10; 434/362, 185, 320, 157, 318, 319, 321, 322, 155, 156, 350; 370/261, 276, 413; 704/7, 20

(56) References Cited

U.S. PATENT DOCUMENTS

| | | | | |
|---|---|---|---|---|
| 4,171,816 A | * | 10/1979 | Hunt | 273/272 |
| 5,428,671 A | * | 6/1995 | Dykes et al. | 379/93 |
| 5,486,112 A | * | 1/1996 | Troudt et al. | 434/250 |
| 5,816,574 A | * | 10/1998 | Holmes | 273/272 |
| 5,967,793 A | * | 10/1999 | Ho et al. | 434/362 |
| 6,021,119 A | * | 2/2000 | Derks et al. | 370/261 |
| 6,077,085 A | * | 6/2000 | Parry et al. | 434/322 |
| 6,112,078 A | * | 8/2000 | Sormunen et al. | 455/411 |
| 6,482,011 B1 | * | 11/2002 | Lee et al. | 434/157 |
| 6,498,921 B1 | * | 12/2002 | Ho et al. | 434/362 |
| 6,505,191 B1 | * | 1/2003 | Baclawski | 707/3 |
| 2001/0055749 A1 | * | 12/2001 | Stefert | 434/322 |

FOREIGN PATENT DOCUMENTS

| DK | 2825571 A | * 12/1979 | G09F/19/06 |
|---|---|---|---|

* cited by examiner

Primary Examiner—Charles Appiah
Assistant Examiner—Naghmeh Mehrpour
(74) Attorney, Agent, or Firm—Bacon & Thomas, PLLC

(57) ABSTRACT

The present invention provides a mobile communication system for learning foreign vocabulary. The popular Internet, mobile communication devices (e.g. Wireless Application Propocol (WAP) mobile phone, General Packet Radio Service (GPRS) mobile phone or Personal Digital Assistant (PDA)), the utility wireless communication system, and a specially designed system software containing a vocabulary database are employed, so that a user can call the system software to provide related foreign vocabulary for studying at all times by means of a mobile communication device.

9 Claims, 5 Drawing Sheets

FIG.3

| 1 | 天　　　　使 |
|---|---|
| 2 | ANGEL |
| 3 | 0 |
| 4 | 2 |
| 5 | 1 |

MOBILE COMMUNICATION SYSTEM FOR LEARNING FOREIGN VOCABULARY

FIELD OF THE INVENTION

The present invention relates to a mobile communication system for learning foreign vocabulary, and more particularly to a mobile communication system for receiving associated vocabulary to study by means of a mobile communication device through RF linkage.

BACKGROUND OF THE INVENTION

The usual way of learning foreign vocabulary is to transcribe related foreign vocabulary from a dictionary on to a notebook for recitation, but this method is generally not very effective. If we can learn foreign vocabulary according to circumstances, or be able to review them during our free time, it will greatly increase our efficiency for learning foreign vocabulary.

However, no one will carry a dictionary at all times in order to look up new or unfamiliar words. If we can utilize the popular mobile communication device for receiving related foreign words through RF linkage, we will be able to learn foreign vocabulary more effectively.

OBJECTS OF THE INVENTION

The primary object of the present invention is to provide a mobile communication system for learning foreign vocabulary by means of the popular Internet, Wireless Application Protocol (WAP) mobile phone/General Packet Radio Service (GPRS) mobile phone, or Personal Digital Assistant (PDA), and the utility wireless communication system, together with a specially designed system software, so that a user can receive related foreign vocabulary to study at all times by means of a mobile communication device.

BRIEF DESCRIPTION OF THE DRAWINGS

The present invention will be better understood by a detailed description with the following drawings:

FIG. 3 shows the database structure for user's personal vocabulary or test vocabulary according to the present invention of mobile communication system for learning foreign vocabulary.

DETAILED DESCRIPTION OF THE INVENTION

Figure 1:
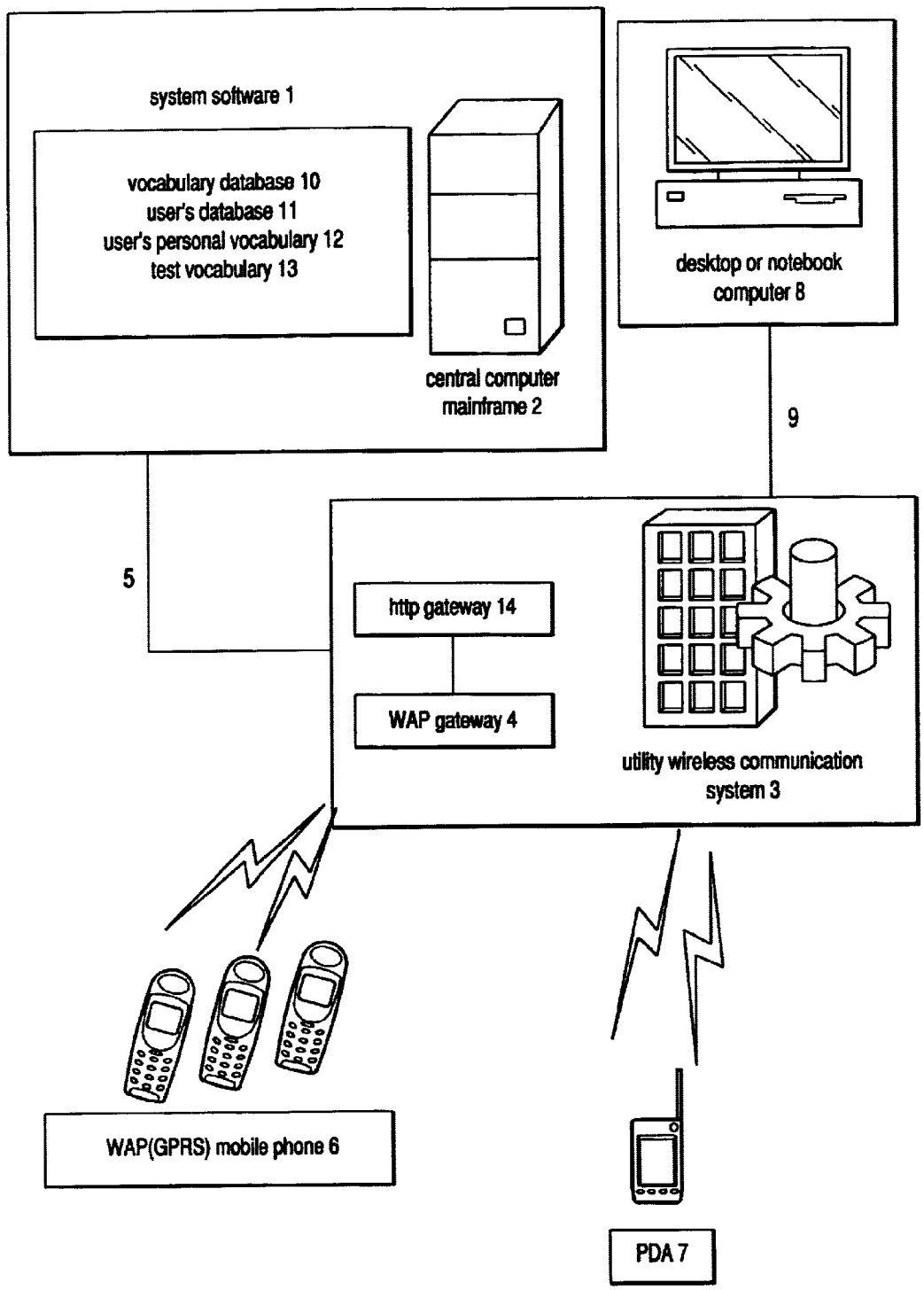
FIG. 1 is a system structure block diagram according to the present invention of mobile communication system for learning foreign vocabulary.

FIG. 1 shows a system structure block diagram according to the present invention of mobile communication system for learning foreign vocabulary. As shown in the figure, the specially designed system software 1 has a complete vocabulary database 10 that is stored in a central computer mainframe 2. The central computer mainframe 2 is connected with the WAP (Wireless Application Protocol) gateway 4 of a utility wireless communication system 3 by line 5. By means of RF transmission, a plurality of users can communicate with the utility wireless communication system 3 by a WAP/GPRS mobile phone 6 or a PDA 7. A user can use his WAP/GPRS mobile phone 6 or PDA 7 to call the central computer mainframe 2 that will provide related foreign vocabulary for the user to study. The present invention is not limited to WAP/GPRS mobile phone 6 or PDA 7. Any type of mobile communication device that is able to receive data from the utility wireless communication system 3 through RF linkage can be used.

The central computer mainframe 2 and the system software 1 of the present invention can also be linked with a desktop or notebook computer 8. This is achieved by connection through a telephone line 9 and an http (hyper text transfer protocol) gateway 14 of the utility wireless communication system 3, as shown in the figure.

Figure 2:
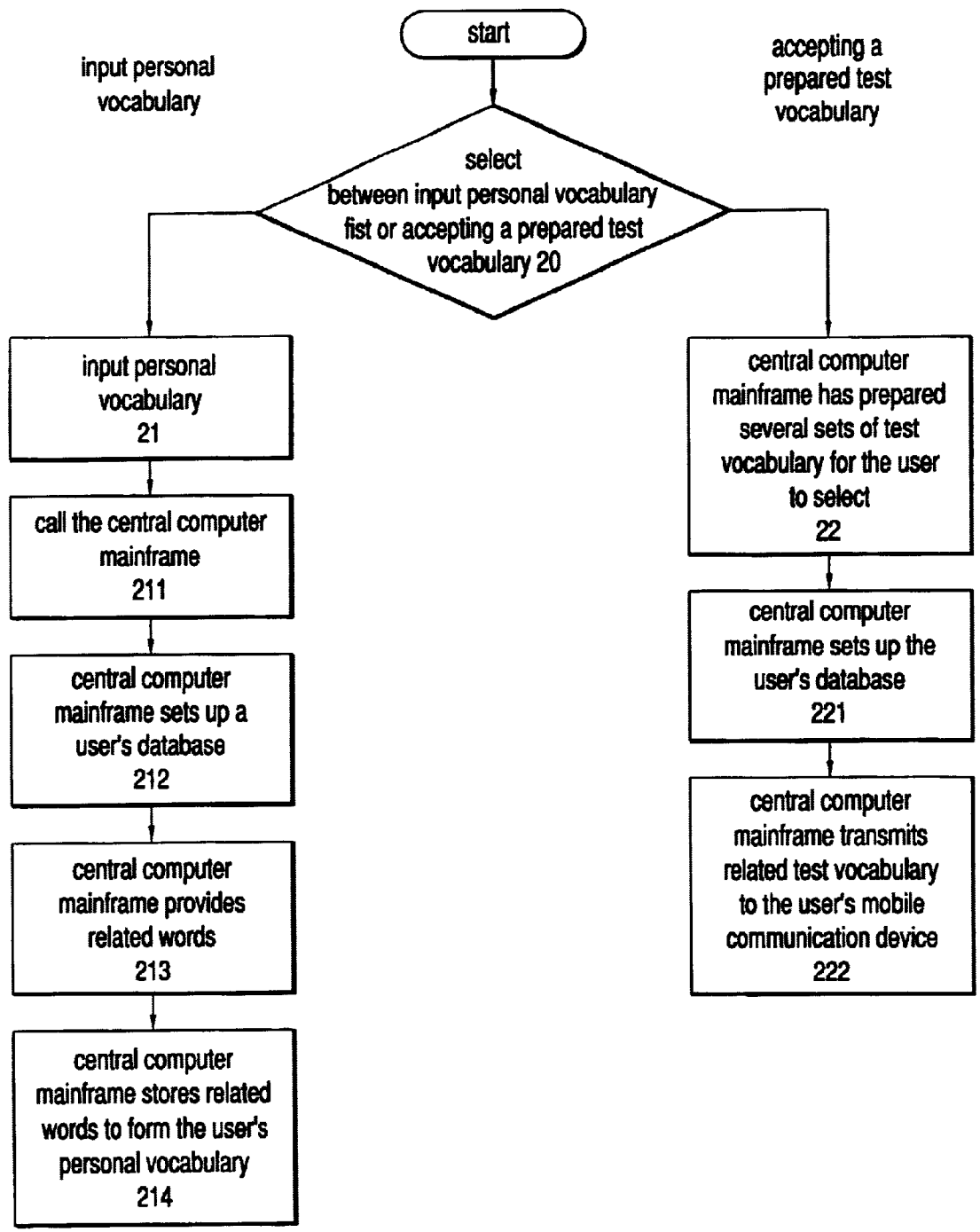
FIG. 2 is a flow chart for users' operation according to the present invention of mobile communication system for learning foreign vocabulary.

FIG. 2 shows a flow chart of the user's operations. The user's first step is to use his WAP/GPRS mobile phone 6 or PDA 7 to select between inputing his personal vocabulary list or accepting a prepared test vocabulary (step 20).

If the user selects inputting his personal vocabulary list, he will input the vocabulary that he wants to learn (step 21). When his list has been entered, he will call the central computer mainframe 2 (step 211). Then the central computer mainframe 2 will use the user's identification code (ID) and password to set up a user's database 11 (step 212). Next, it will transmit the vocabulary requested by the user through RF linkage into the user's mobile communication device to provide related words and explanations thereof (step 213). The vocabulary requested by the user will be stored in the central computer mainframe 2 to form the user's personal vocabulary 12 for future testing when requested by the user (step 214).

If the user selects the option of accepting a test vocabulary, the system software 1 of the central computer mainframe 2 has prepared several sets of test vocabulary 13 of different levels based on the vocabulary database 10. Therefore, the user can select a suitable set of test vocabulary 13 to test himself (step 22). This set of test vocabulary 13 will be the user's proprietary test vocabulary 13 for future testing. The central computer mainframe 2 will use the user's identification code (ID) and password to set up the user's database 11 (step 221). Then it will transmit the user's selected set of test vocabulary 13 to the user's mobile communication device through RF linkage to test the user (step 222).

The method in which the present invention will test the user is described below. Both the user's personal vocabulary 12 and the test vocabulary 13 can be used for testing.

First of all, the user will use his WAP/GPRS mobile phone 6 or PDA 7 to link with the central computer mainframe 2 through the utility wireless communication system 3 by means of RF linkage. Then the user will download relevant user's personal vocabulary 12 or the test vocabulary 13. For example, the display of the mobile communication device of the user may display:

Do you know the word below?
ANGEL
[1] YES [2] MAYBE [3] NO

After the user has selected an answer, the mobile communication device will display:

Do you want to display this word next time?
ANGEL天使
[1] YES [2] NO

After the user has selected an answer, the mobile communication device will continue through a list of words until the test is completed. When the test is finished, the mobile communication device will display:

Do you want to send out the test result?
[1] YES [2] TEST AGAIN

If the user selects "TEST AGAIN", the mobile communication device will redisplay the same test vocabulary list from the beginning. If the user selects "YES" (i.e. to send out the test result), then the mobile communication device will link with the central computer mainframe 2 through RF linkage to send the test result back to the central computer mainframe 2. The system software 1 will then analyze the test result and user's response to update the user's personal vocabulary 12 or test vocabulary 13 for future testing.

Figure 3:
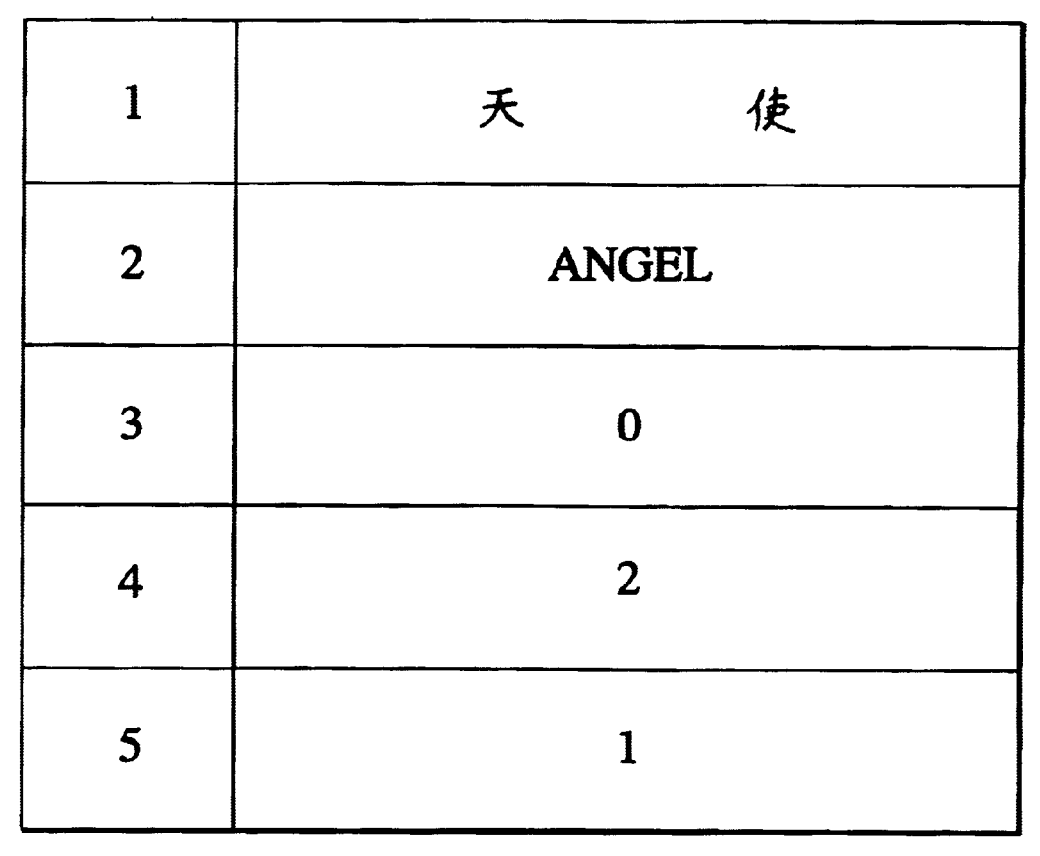

FIG. 3 shows the database structure for user's personal vocabulary 12 or test vocabulary 13. Each vocabulary stored in the user's personal vocabulary 12 or test vocabulary 13 has several fields to show related attributes. The first field shows the related vocabulary in the user's language of choice, e.g. "天使". The second field shows the corresponding foreign vocabulary, e.g. "ANGEL". The third field shows the number of times the message "do not display next time" was selected by the user during testing. With respect to the third field, the user can set a predetermined number "P" to indicate the number of times the message "do not display next time" must be selected before the word is removed from his vocabulary list. When the number of times this message being selected is greater than "P", it indicates that the user is already familiar with the word and the word will not be displayed in the future. The fourth field shows the number of times that the vocabulary has been sent out. The fifth field shows a number which corresponds with the vocabulary's level of difficulty during testing (a larger number indicates a higher importance which was calculated based on the individual user's test result).

Figure 4:
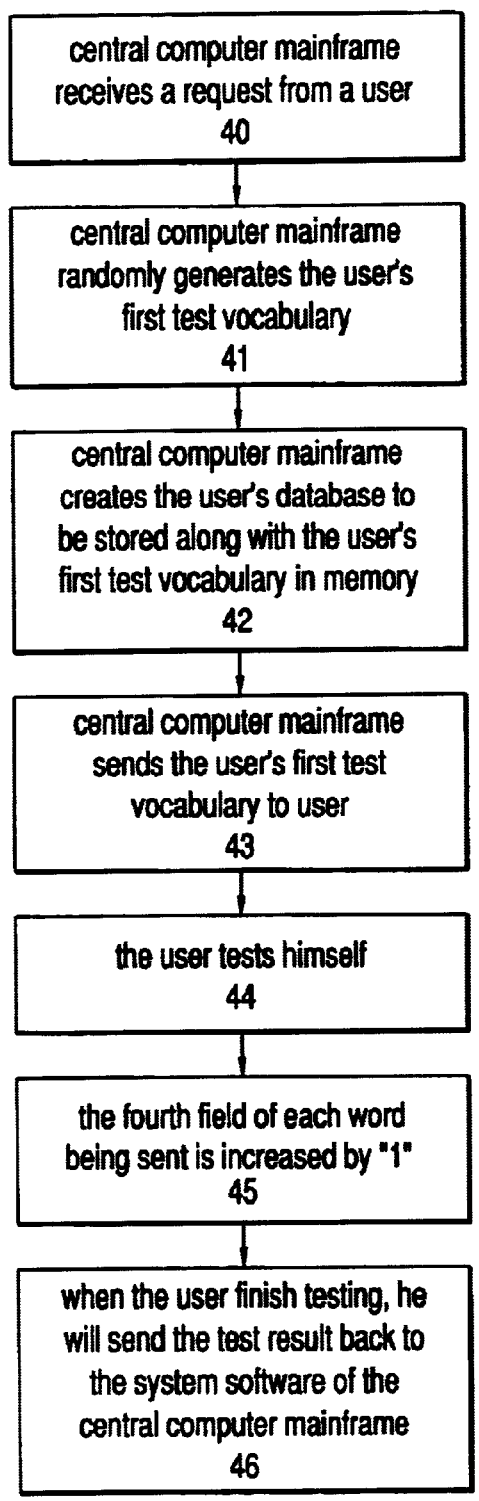
FIG. 4 shows the flow chart of the system software for issuing test vocabulary for the first time according to the present invention of mobile communication system for learning foreign vocabulary.

FIG. 4 shows the flow chart of the system software for issuing the first test vocabulary 13. When the central computer mainframe 1 receives a request from a user (step 40), the system software 1 will process the user's objectives and requirements. Next, it will randomly select several related words from the vocabulary database 10 to generate the user's first test vocabulary 13 (step 41). Then the user's identification code (ID) and password are compiled to create the user's database 11. This information is stored along with the user's first test vocabulary 13 in computer's memory (step 42). Each vocabulary in the user's first test vocabulary 13 has its own attribute structure, with the third, the fourth and the fifth field to be contained with the number "0". The user's first test vocabulary 13 will be sent to the mobile communication device of the user through RF linkage (step 43), for testing the user (step 44), and the fourth field of each vocabulary being sent is automatically increased by one (step 45). When the user finishes testing, he will call the central computer mainframe 2 to send the test result back to the system software 1 for further processing (step 46).

Figure 5:
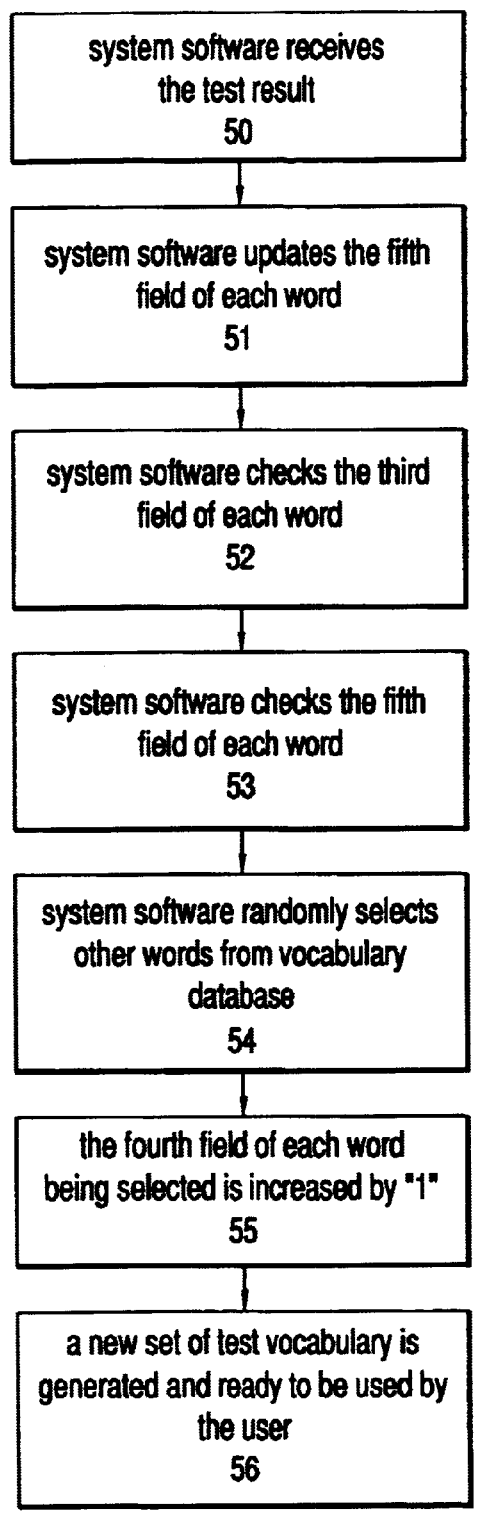
FIG. 5 shows the flow chart of the system software for revising test vocabulary according to the present invention of mobile communication system for learning foreign vocabulary.

FIG. 5 shows the flow chart of the system software for revising test vocabulary. When the system software 1 receives the test result transmitted from the user (step 50), the test result is processed and analyzed in order to update the fifth field (step 51). If the user does not know the word, then the word is considered to be of higher importance and it is therefore assigned a higher value. The system will scan all the attributes of each vocabulary in user's test vocabulary 13. If the value of the third field is larger than the "P" value set by the user, it indicates that the user is already familiar with the word. Therefore the system software will delete the already familiar word from the user's test vocabulary 13 (step 52). The fifth field is then scanned (step 53). Since a larger number indicates a higher level of importance, words with larger number will be prioritized and sent out during the next test. Next, the vocabulary database 10 randomly selects some other vocabularies for the user to learn (step 54). The fourth field of each word being selected will be increased by one (step 55). Therefore, a new set of test vocabulary 13 is generated and ready to be used by the user (step 56).

The language of choice and the foreign vocabulary in the present invention has no limitation at all, any type of native language and any foreign vocabulary can be adopted by the present invention.

The scope of the present invention depends only upon the following Claims, and is not limited by the above embodiment.

What is claimed is:

1. A mobile communication system for learning foreign vocabulary,
comprising a specially designed system software having a vocabulary database to be stored in a central computer mainframe, said central computer mainframe being connected with a utility wireless communication system, so that a user can use a mobile communication device to call said central computer mainframe through RF linkage provided by said utility wireless communication system, and instruct said system software to send related vocabulary through RF linkage to said mobile communication device for study,
wherein said system software further comprises a user's data base, a user's personal vocabulary, and a test vocabulary for each user,
wherein each vocabulary in said user's personal vocabulary and said test vocabulary has a data structure for recording related attributes, and
wherein a first field of said data structure records a related mother tongue; a second field of said data structure records a corresponding foreign vocabulary; a third field of said data structure records a number of times the user has set the message "do not display next time" to appear; a fourth field of said data structure records a number of times the vocabulary has been sent; and a fifth field of said data structure records an importance of said data structure during testing, said importance being calculated by said system software based on a test result sent by the user after the user has finished testing, with an understanding that a larger number indicates that the test result is of higher importance.

2. A mobile communication system for learning foreign vocabulary according to claim 1, wherein said central computer mainframe is connected with a WAP (Wireless Application Protocol) gateway of said utility wireless communication system.

3. A mobile communication system for learning foreign vocabulary according to claim 1, wherein said mobile communication device comprises a WAP (Wireless Application Protocol), GPRS (General Packet Radio Service) mobile phone, or PDA (Personal Digital Assistant).

4. A mobile communication system for learning foreign vocabulary according to claim 1, wherein said central computer mainframe and said system software can be linked with a desktop or notebook computer by a telephone line through an http (hyper text transfer protocol) gateway of said utility wireless communication system to provide related vocabulary to a user for study.

5. A mobile communication system for learning foreign vocabulary according to claim 1, wherein said user's database is used for storing a user's identification code (ID) and password.

6. A mobile communication system for learning foreign vocabulary according to claim 1, wherein after a user calls said central computer mainframe to provide related vocabulary through RF linkage, said related vocabulary will be stored in said user's personal vocabulary by said system software for future testing.

7. A mobile communication system for learning foreign vocabulary according to claim 1, wherein said test vocabulary is first randomly generated from said vocabulary database by said system software, and when a user calls said central computer mainframe through RF linkage to ask for a testing, said system software will select related test vocabulary for transmitting to said user's mobile communication device to test the user.

8. A mobile communication system for learning foreign vocabulary according to claim 1, wherein a "P" value for said third field can be set by said user, and if the number of said third field is larger than said P value, then said vocabulary has already been familiarized by said user, and will not be sent for future testing.

9. A mobile communication system for learning foreign vocabulary according to claim 8, wherein said third, fourth, and fifth fields of each vocabulary of said user's personal vocabulary and said test vocabulary are variable, and are used as a reference for revising said user's personal vocabulary and said test vocabulary, and wherein after the user's test result is received by said system software, a new value for said fifth field of each vocabulary is calculated based on said test result, then said third field of each vocabulary is checked, and if the value of said third field is larger than said "P" value set by the user, then said vocabulary is deemed to be familiarized by said user, and will be deleted, next, said fifth field of each vocabulary is checked, a larger number indicating more importance, and its selection is prioritized, and finally, some other vocabulary words from said vocabulary database are randomly selected, and said fourth field of all the selected vocabularies is increased by one, a new set of test vocabulary therefore being generated and awaiting the user's next testing session.

* * * * *